United States Patent
Basu Mallick et al.

(10) Patent No.: US 10,841,929 B2
(45) Date of Patent: Nov. 17, 2020

(54) MAPPING AN ACCESS ATTEMPT TYPE TO A NETWORK CONFIGURATION

(71) Applicant: Motorola Mobility LLC, Chicago, IL (US)

(72) Inventors: Prateek Basu Mallick, Langen (DE); Joachim Loehr, Wiesbaden (DE); Ravi Kuchibhotla, Clarendon Hills, IL (US); Genadi Velev, Darmstadt (DE)

(73) Assignee: Motorola Mobility LLC, Chicago, IL (US)

( * ) Notice: Subject to any disclaimer, the term of this patent is extended or adjusted under 35 U.S.C. 154(b) by 16 days.

(21) Appl. No.: 15/961,694

(22) Filed: Apr. 24, 2018

(65) Prior Publication Data

US 2018/0310321 A1    Oct. 25, 2018

Related U.S. Application Data

(60) Provisional application No. 62/489,398, filed on Apr. 24, 2017.

(51) Int. Cl.
| | |
|---|---|
| *H04W 72/08* | (2009.01) |
| *H04L 12/851* | (2013.01) |
| *H04W 48/16* | (2009.01) |
| *H04W 74/08* | (2009.01) |
| *H04L 12/927* | (2013.01) |

(52) U.S. Cl.
CPC ....... *H04W 72/085* (2013.01); *H04L 47/2425* (2013.01); *H04W 48/16* (2013.01); *H04L 47/805* (2013.01); *H04W 74/0833* (2013.01)

(58) Field of Classification Search
CPC .................................................. H04W 72/085
See application file for complete search history.

(56) References Cited

U.S. PATENT DOCUMENTS

| | | | |
|---|---|---|---|
| 2012/0102144 A1* | 4/2012 | Fritsche | H04L 69/26 709/217 |
| 2013/0301541 A1* | 11/2013 | Mukherjee | H04W 74/0833 370/329 |
| 2017/0164349 A1* | 6/2017 | Zhu | H04W 48/18 |
| 2018/0103465 A1* | 4/2018 | Agiwal | H04W 74/004 |
| 2018/0332539 A1* | 11/2018 | Fan | H04W 52/346 |
| 2018/0376407 A1* | 12/2018 | Myhre | H04W 48/16 |

OTHER PUBLICATIONS

Huawei, Hisilicon, "UE Awareness of Network Slice", 3GPP TSG-RAN W2#97bis, R2-1702588, Apr. 3-7, 2017, pp. 1-3.
PCT/US2018/029212, "Notification of Transmittal of the International Search Report and the Written Opinion of the International Searching Authority, or the Declaration", International Searching Authority, Jul. 18, 2018, pp. 1-11.
Samsung, "Slice Awareness in Initial Access", 3GPP TSG-RAN WG2 Meeting 97bis, R2-1703341, Apr. 3-7, 2017, pp. 1-2.

\* cited by examiner

*Primary Examiner* — Kodzovi Acolatse
*Assistant Examiner* — Abdeltif Ajid
(74) *Attorney, Agent, or Firm* — Kunzler Bean & Adamson

(57) ABSTRACT

Apparatuses, methods, and systems are disclosed for mapping an access attempt type to a network configuration. One method includes determining a mapping between the access attempt type and a first network resource partition of multiple network configurations. Determining a mapping between the access attempt type and a first network configuration is based at least partly on an establishment cause of the access attempt type. The method includes transmitting the mapping to a remote unit.

22 Claims, 6 Drawing Sheets

MAPPING AN ACCESS ATTEMPT TYPE TO A NETWORK CONFIGURATION

CROSS-REFERENCE TO RELATED APPLICATIONS

This application claims priority to U.S. patent application Ser. No. 62/489,398 entitled "DIFFERENTIATED TREATMENT OF SERVICES FOR ACCESSING RADIO NETWORK" and filed on Apr. 24, 2017 for Prateek Mallick, which is incorporated herein by reference in its entirety.

FIELD

The subject matter disclosed herein relates generally to wireless communications and more particularly relates to mapping an access attempt type to a network configuration.

BACKGROUND

In certain wireless communications networks, URLLC communication may be used. The following abbreviations are herewith defined, at least some of which are referred to within the following description: Third Generation Partnership Project ("3GPP"), Positive-Acknowledgment ("ACK"), Access and Mobility Management Function ("AMF"), Binary Phase Shift Keying ("BPSK"), Base Station ("BS"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Data Radio Bearer ("DRB"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), 5G Node B ("GNb"), Globally Unique Temporary UE Identity ("GUTI"), Home Location Register ("HLR"), Home Public Land Mobile Network ("HPLMN"), Home Subscriber Server ("HSS"), Hybrid Automatic Repeat Request ("HARQ"), Identity ("ID"), International Mobile Subscriber Identity ("IMSI"), Internet-of-Things ("IoT"), Layer 1 ("L1"), Layer 2 ("L2"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Mobility Management Entity ("MME"), Multi User Shared Access ("MUSA"), Non Access Stratum ("NAS"), Narrowband ("NB"), Negative-Acknowledgment ("NACK") or ("NAK"), Network Function ("NF") (e.g., a network entity performing a well-defined function, such as AMF, SMF, PCF, UDM, etc.), Next Generation Node B ("gNB"), New Radio ("NR"), Network Slice Selection Assistance Information ("NSSAI") (e.g., a vector value including one or more S-NSSAI values), Network Slice Instance ("NSI") (e.g., a logical network that provides specific network capabilities and network characteristics), Non-Orthogonal Multiple Access ("NOMA"), Operation and Maintenance System ("OAM"), Orthogonal Frequency Division Multiplexing ("OFDM"), Primary Cell ("PCell"), Policy Control Function ("PCF"), Physical Broadcast Channel ("PBCH"), Physical Downlink Control Channel ("PD-CCH"), Physical Downlink Shared Channel ("PDSCH"), Pattern Division Multiple Access ("PDMA"), Packet Data Unit ("PDU"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Registration Area ("RA"), Radio Resource Control ("RRC"), Random Access Procedure ("RACH"), Radio Access Network ("RAN"), Random Access Response ("RAR"), Radio Network Temporary Identifier ("RNTI"), Reference Signal ("RS"), Remaining Minimum System Information ("RMSI"), Radio Resource Control ("RRC"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Service Level Agreement ("SLA"), Signal-to-Interference-Plus-Noise Ratio ("SINK"), Session Management Function ("SMF"), System Information Block ("SIB"), Synchronization Signal ("SS"), Single Network Slice Selection Assistance Information ("S-NSSAI"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), Unified Data Management ("UDM"), Unified Data Repository ("UDR"), User Entity/Equipment (Mobile Terminal) ("UE") (e.g., mobile equipment "ME", subscriber identity and/or identification module "SIM"), Uplink ("UL"), Universal Mobile Telecommunications System ("UMTS"), Uplink Pilot Time Slot ("UpPTS"), User Plane ("UP"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, use of network resources may be determined by the network. In such networks, the network resources may be inefficiently used.

BRIEF SUMMARY

Apparatuses for mapping an access attempt type to a network configuration are disclosed. Methods and systems also perform the functions of the apparatus. In one embodiment, the method includes determining a mapping between the access attempt type and a first network configuration of multiple network configurations. In such embodiments, the mapping is based at least partly on an establishment cause of the access attempt type. In certain embodiments, the method includes transmitting the mapping to the remote unit.

In one embodiment, the mapping between the access attempt type and the first network configuration is based at least partly on a user equipment policy, a network policy, or a combination thereof. In a further embodiment, the first network configuration is configured to provide a higher priority service level than a second network configuration of the multiple network configurations.

In certain embodiments, the method includes receiving a random access channel communication corresponding to the access attempt type using resources from the first network configuration. In various embodiments, the mapping between the access attempt type and the first network configuration is based at least partly on whether the access attempt type corresponds to transmitting control information, data, or a combination thereof.

In some embodiments, the method includes granting access to a random access channel based at least partly on the establishment cause. In certain embodiments, the method includes granting a radio resource control connection based at least partly on the establishment cause. In some embodiments, the first network configuration includes a predetermined configuration of physical layer parameters and data link layer parameters resources. In various embodiments, the first network configuration includes a predetermined configuration of physical random access channel resources. In certain embodiments, the predetermined configuration of the physical random access channel resources includes at least one of a physical random access channel preamble, a time resource, a frequency resource, a transmit power ramp, a power ramping step size, and a backoff timer value.

An apparatus for mapping and access attempt type to a network configuration, in one embodiment, includes a processor that determines a mapping between the access attempt type and a first network configuration of multiple network configurations wherein the mapping is based at least partly on an establishment cause of the access attempt type. In certain embodiments, the apparatus includes a transmitter that transmits the mapping to a remote unit.

In one embodiment, a method for mapping an access attempt type to a network configuration includes receiving a mapping between an access attempt type and a first network configuration of multiple network configuration. In certain embodiments, the mapping is based at least partly on an establishment cause of the access attempt type. In various embodiments, the method includes transmitting information corresponding to the establishment cause using resources identified by the first network configuration.

In some embodiments, the mapping between the access attempt type and the first network configuration is based at least partly on a user equipment policy, a network policy, or a combination thereof. In certain embodiments, the first network configuration is configured to provide a higher priority service level than a second network configuration of the multiple network configuration.

In various embodiments, the method includes transmitting a random access channel communication corresponding to an access attempt type using resources from the first network configuration. In certain embodiments, the mapping between the access attempt type and the first network configuration is based at least partly on whether the access attempt type corresponds to transmitting control information, data or a combination thereof. In some embodiments, a random-access channel is established as a result of transmitting the information.

In some embodiments, the method includes initiating establishment of a radio resource control connection based at least partly on the establishment cause. In various embodiments, the first network configuration includes a predetermined configuration of physical layer resources and data link layer resources. In certain embodiments, the first network configuration includes a predetermined configuration of random-access channel resources. In such embodiments, the predetermined configuration of physical random-access channel resources may include at least one of a physical random-access channel preamble, a time resource, a frequency resource, a transmit power, a power ramping step size, and a backoff timer value.

An apparatus for mapping an access attempt type to a network configuration, in one embodiment, includes a receiver that receives a mapping between an access attempt type and a first network configuration of multiple network configurations. In various embodiments, the mapping is based at least partly on an establishment cause of the access attempt type. In certain embodiments, the apparatus includes a transmitter that transmits information corresponding to the access attempt type using resources identified by the first network configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which.

DETAILED DESCRIPTION

Figure 1:
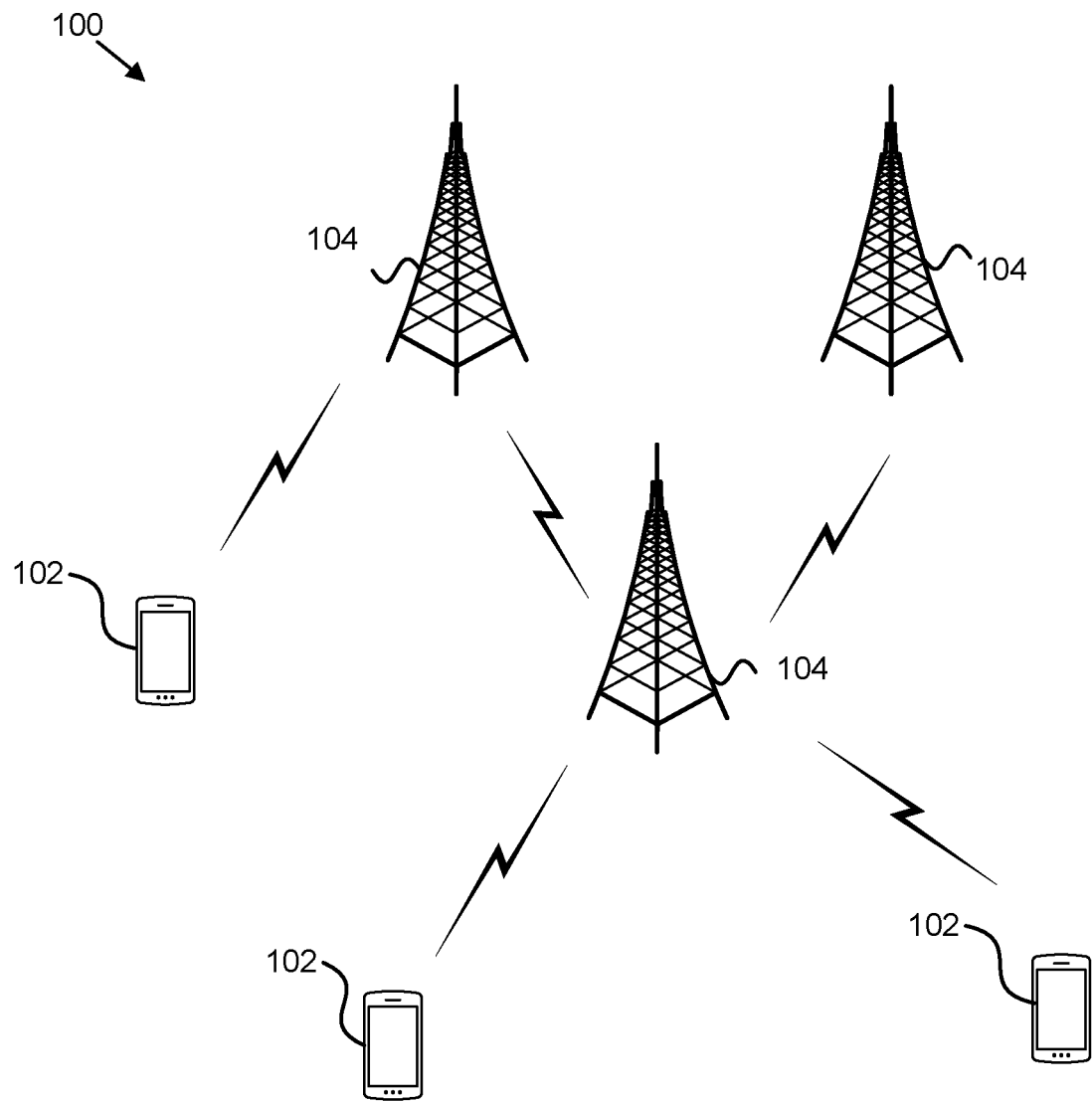
FIG. 1 is a schematic block diagram illustrating one embodiment of a wireless communication system for mapping an access attempt type to a network configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit including custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for mapping an access attempt type to a network configuration (e.g. physical layer and data link layer configurations, PRACH resources, transmit power, power ramping step size, backoff timer value, etc.). In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In various embodiments, the remote units 102 may communicate directly with one or more other remote units 102.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using an SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may receive a mapping between an access attempt type and a first network configuration (e.g. resource partition, physical layer parameters, data link layer parameters) of multiple network configurations. In such embodiments, the mapping may be based at least partly on an establishment cause of the access attempt type. In various embodiments, the remote unit 102 may transmit information corresponding to the establishment cause using resources identified by the first network configuration. Accordingly, the remote unit 102 may use a mapping between an access attempt type and a network configuration.

In some embodiments, a network unit 104 may determine a mapping between an access attempt type and a first network configuration of multiple network configurations. In such embodiments, the mapping may be based at least partly on an establishment cause of an access attempt type. In certain embodiments, the network unit 104 may transmit the mapping to the remote unit 102. Accordingly, the network unit 104 may map an access attempt type to a network configuration.

Figure 2:
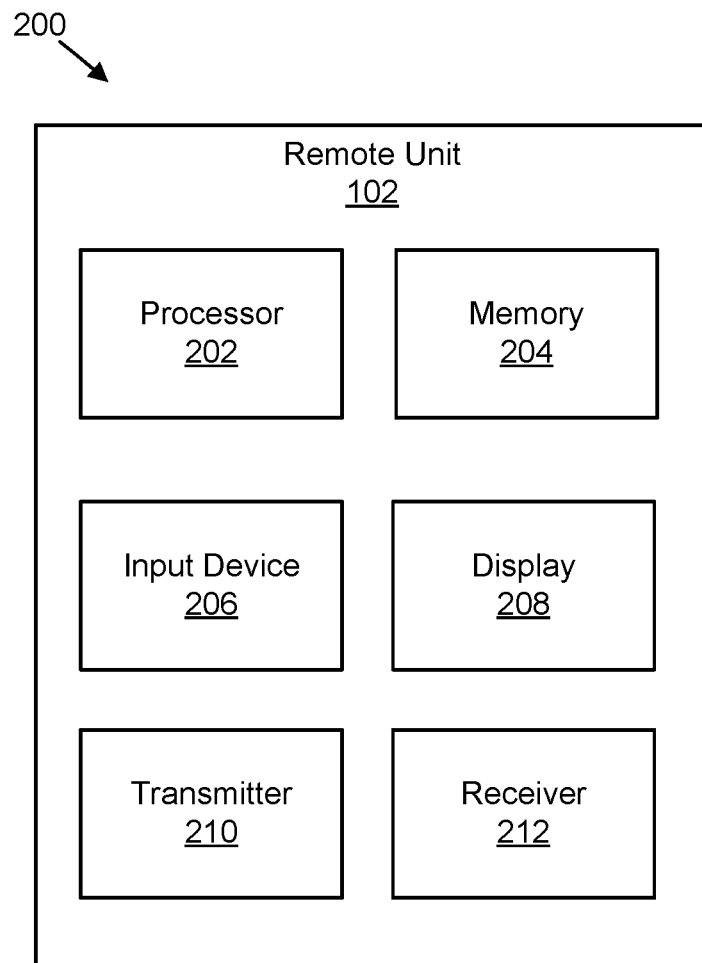
FIG. 2 is a schematic block diagram illustrating one embodiment of an apparatus that may be used for receiving a mapping between an access attempt type and a network configuration.

FIG. 2 depicts one embodiment of an apparatus 200 that may be used for receiving a mapping between an access attempt type and a network configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to mapping an access attempt type to a network configuration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104, and the receiver 212 is used to receive DL communication signals from the network unit 104. In certain embodiments, the receiver 212 is used to receive a mapping between an access attempt type and a first network configuration of multiple network configurations. In such embodiments, the mapping may be based at least partly on an establishment cause of the access attempt type. In one embodiment, the transmitter 210 is used to transmit information corresponding to the access attempt type using resources identified by the first network configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
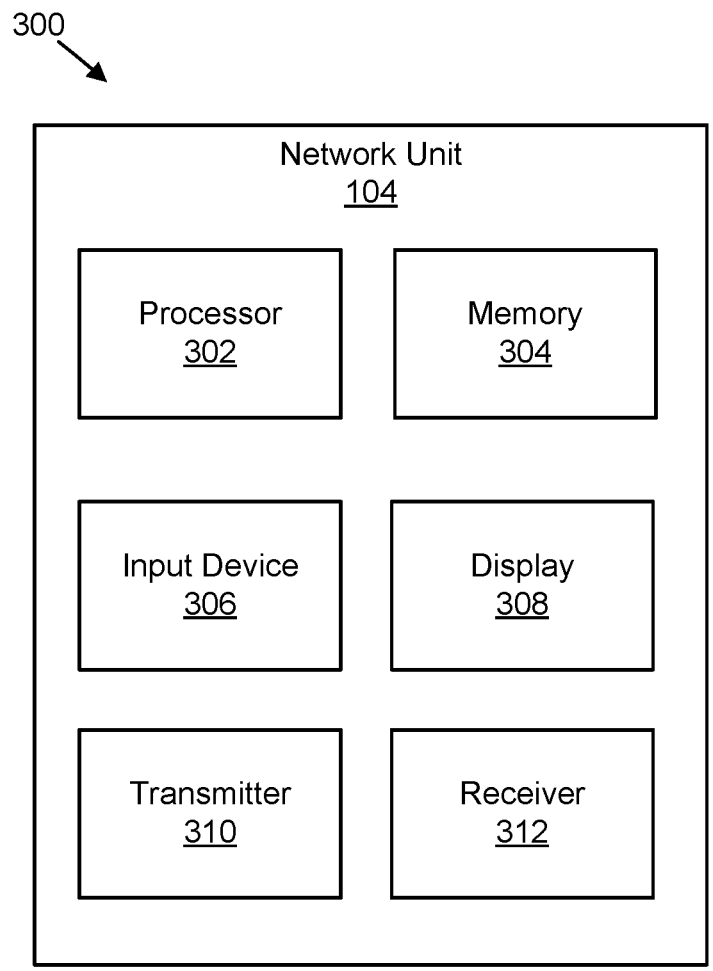
FIG. 3 is a schematic block diagram illustrating another embodiment of an apparatus that may be used for mapping an access attempt type to a network configuration.

FIG. 3 depicts one embodiment of an apparatus 300 that may be used for mapping an access attempt type to a network configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive a request from a remote unit 102. In various embodiments, the processor 302 may determine a mapping between the access attempt type and a first network resource partition of multiple network resource partitions. In such embodiments, the mapping may be based at least partly on an establishment cause of the access attempt type. In certain embodiments, the transmitter 310 may transmit the mapping to the remote unit 102. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, there may be many applications and/or services that run on or use wireless mobile equipment. Some of these services may be delay tolerant and may be fine with varying amounts of data packet loss. In contrast, some services may be strict, may not tolerate an end-to-end delay of more than one millisecond or a few milliseconds, and/or should be extremely reliable. For example, in some applications, even one packet lost in millions or even billions might be too high.

Moreover, some services, once launched, may be able to access a network quickly. Other services might tolerate some delay in the order of tens of milliseconds or even longer. In some embodiments, partitioning may be performed based on a mobile device's protocol perspective to accommodate different requirements related to various services.

In certain embodiments, radio access resource (e.g., PRACH) partitioning may be done based on various inputs to a network mapping policy. For example, a PRACH resource partition may be mapped to a particular network slice. In a mapping in which a PRACH resource partition maps to a particular network slice, hundreds of PRACH partitions may be used to serve hundreds of network slices.

In various embodiments, having numerous PRACH partitions may lead to fragmentation in which some partitions are not sufficiently used, while heavy use of some other partitions may lead to heavy congestion, service access failure, and/or denial of service. Accordingly, some embodiments may avoid a large number of PRACH resource partitions.

One way to avoid having a large number of PRACH resource partitions may be to limit mapping of a few network slices to a particular PRACH resource partition and to map all other network slices to the remainder of the PRACH resources provided by the network. In certain embodiments, a network may provide a specific L1/L2 configuration corresponding to each partitioned PRACH resource, as described herein.

Figure 4:
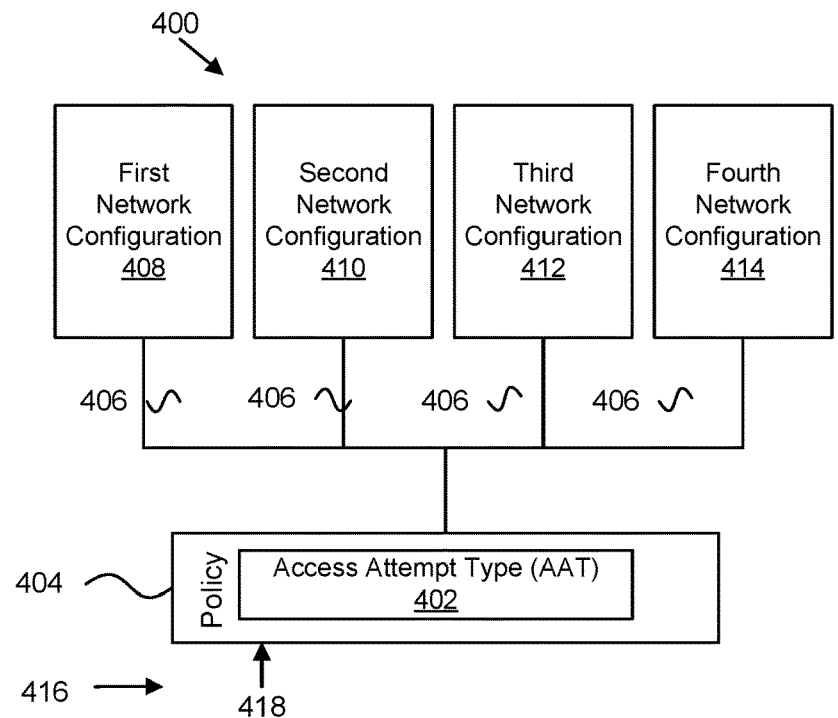
FIG. 4 is a schematic diagram illustrating one embodiment of mapping an access attempt type and a network configuration.

FIG. 4 is a schematic diagram illustrating one embodiment of mapping 400 an access attempt type ("AAT") to a network resource partition. The mapping 400 may be performed by any suitable device, such as a network unit 104. In various embodiments, a number of network resource partitions may be minimized to reduce resources. For example, in some embodiments, four partitions may be sufficient. As may be appreciated, more than four or fewer than four network resource partitions may be used while still minimizing a total number of network resource partitions. In certain embodiments, each partition may accommodate a group of access attempt types 402 designated for a particular network resource partition. In various embodiments, the group of access attempt types 402 may be derived based on a policy 404. In certain embodiments, the policy 404 may be configured by a network unit 104. For example, the policy 404 may be signaled directly and/or may be configured using open mobile alliance device management.

In certain embodiments, a mapping 406 is determined between the group of access attempt types 402 and a network resource partitions. For example, the mapping 406 may be determined between the group of access attempt types 402 and a first network resource partition 408, a second network resource partition 410, a third network resource partition 412, and a fourth network resource partition 414.

In some embodiments, a network unit 104 may communicate to a remote unit 102 that determining the AAT may be based on one or more inputs 416, such as an establishment cause 418. In certain embodiments, such as described below with respect to FIG. 5, other inputs 416 may include a service type 420, a slice type 422, and/or an access class 424.

In some embodiments, the policy 404 may be configured according to a particular remote unit 102. For example, for certain types of remote units 102, URLLC services may be important and may be mapped to a partition (e.g., the first network partition 408) having a highest priority. For other types of remote units 102, the policy 404 may restrict remote units 102 from using a partition with the highest priority.

In various embodiments, the policy 404 may be a combination of remote unit 102 based policies and network unit 104 based policies. For example, a remote unit 102 policy prioritizing certain services may be combined with a network unit 104 policy facilitating certain access classes using certain partitions. As may be appreciated, the policy 404 may include any combination of network-based (e.g., network unit 104 based) policies and/or remote unit 102 based policies to determine the AAT.

In certain embodiments, the policy 404 may be configured such that a particular service type may map to a partition that has a highest priority if the establishment cause 418 is mobile-originated data ("MO-Data").

Figure 5:
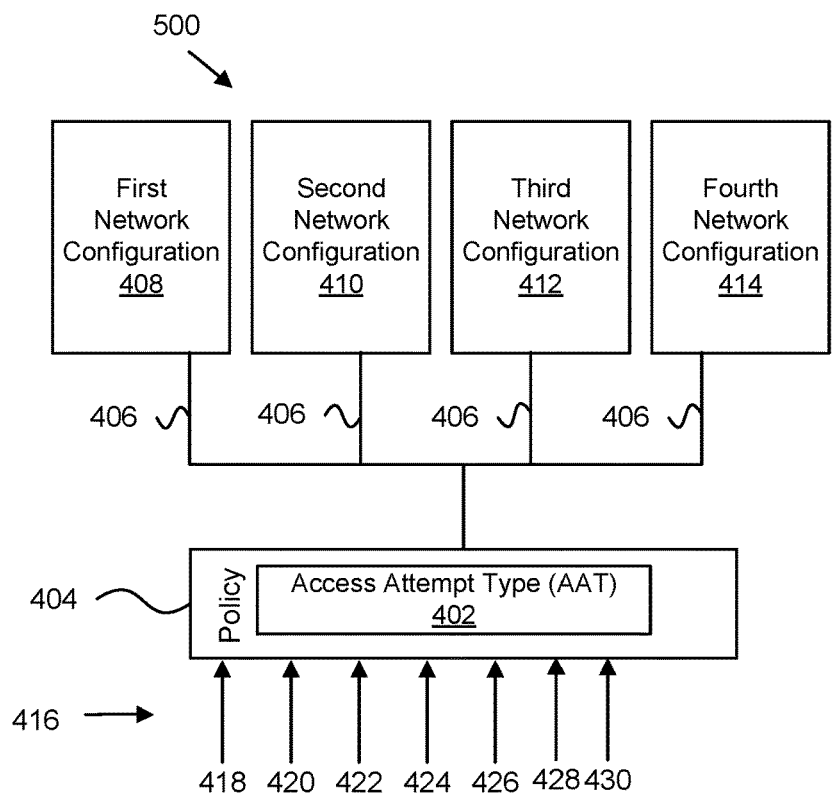
FIG. 5 is a schematic diagram illustrating another embodiment of mapping a group of access attempt types and a network configuration.

FIG. 5 is a schematic diagram illustrating another embodiment of mapping 500 between the group of access attempt types 402 and a network resource partition (e.g., network resource partitions 408, 410, 412, 414). In certain embodiments, the group of access attempt types 402 may be determined from a combination of the one or more inputs 430, such as the establishment cause 418, a service type 420, a slice type 422, and an access class 424.

In various embodiments, the policy 404 may be configured so a particular slice type maps to a partition (e.g., the first network resource partition 408) that has a highest priority if the access class is within a grouping of accesses classes (e.g., access class 11 through access class 15). In some embodiments, extended access classes may be used (e.g., access class 16 through access class 25) and some of these access classes may be enabled to use selected predetermined network resource partitions (e.g., network resource partitions 408, 410, 412, and/or 414). In various embodiments, certain remote units 102 with specific access classes and/or remote units 102 that support certain application types or slice types may be mapped to predetermined network resource partitions. In certain embodiments, certain remote units 102 with specific access classes and/or remote units 102 that support certain application types or slice types may not be allowed to use certain predetermined network resource partitions.

In some embodiments, the mapping 500 may operate using one or more of the following: a network unit 104 may broadcast a number of partitions (e.g., two, three, four, five, six, etc.); a network unit 104 may broadcast the mapping 406 of the access attempt type to a particular network resource partition; a network unit 104 may broadcast radio configurations (e.g., L1 and/or L2 configuration for accessing a RAN); a network unit 104 may broadcast PRACH resources for corresponding network resource partitions (e.g., for network resource partitions 408, 410, 412, and/or 414). As described herein, in some embodiments, the policies 404 that determine the mapping between the group of access attempt types 402 and the network resource partitions may depend on whether the access attempt type corresponds to control information 426 and/or data 428.

In various embodiments, the policy 404 may depend on an RRC state 430 of a remote unit 102. In certain embodiments, the remote unit 102 may have an RRC state of idle (e.g., RRC idle), connected (e.g., RRC connected), or inactive (e.g., RRC inactive). In some embodiments, a network unit 104 may use policies 404 that are specific to an RRC state. For example, in an RRC connected state, the policy 404 may take into account the slice type 422. In certain embodiments, other inputs 416 such as access class 424 may also be taken into account in determining the access attempt type and mapping the access attempt type to a network resource partition.

In some embodiments, the group of access attempt types 402 corresponding to a remote unit 102 may be based on an applicable policy taking into account two or more inputs 430, such as the establishment cause 418, the service type 420, the slice type 422, and/or the access class 424. In various embodiments, after the group of access attempt types 402 is determined, a remote unit 102 may begin using a network resource partition (e.g., L1 and/or L2 configuration, PRACH resources, etc.) of the mapping 406 to carry out an access attempt (e.g., RACH towards a network unit 104, etc.). In some embodiments, certain network resource partitions may provide a relatively greater number of physical resources than other network resource partitions. In such embodiments, such partitions may provide faster and/or more reliable access to a radio network.

In certain embodiments, accessing a radio network may refer to an initial access at a time in which a remote unit 102 is in an RRC idle state, a remote unit 102 in an RRC connected state, a remote unit 102 in an RRC inactive state, and/or a remote unit 102 launching a new service and/or application (e.g., accessing a radio network may refer to transmitting a NAS service request). In some embodiments, contention free resources for UL access and/or transmission may be granted for specific AATs such as emergency calls.

Figure 6:
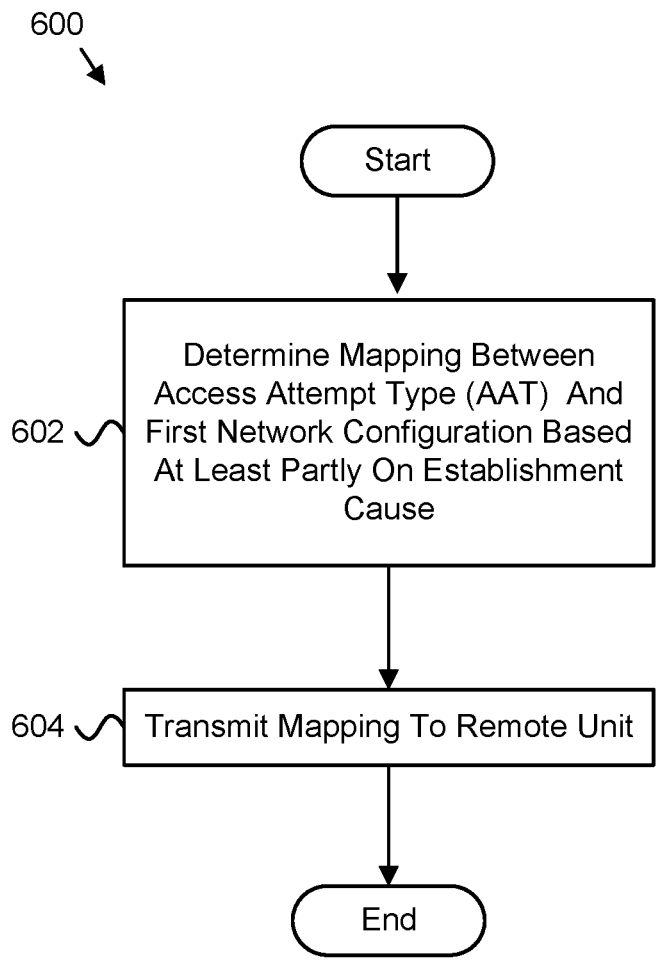
FIG. 6 is a schematic flow diagram illustrating one embodiment of a method for mapping an access attempt type to a network configuration.

FIG. 6 is a schematic flow diagram illustrating one embodiment of a method 600 for mapping an access attempt type to a network resource partition. In some embodiments, the method 600 is performed by an apparatus, such as the network unit 104. In certain embodiments, the method 600 may be performed by a processor executing program code, for example, a microcontroller, a microprocessor, a CPU, GPU, and accelerated processing unit, an FPGA, or the like.

The method 600 may include determining 602 a mapping between the access attempt type and a first network resource partition of multiple network resource partitions. In some embodiments, the mapping is based at least partly on an establishment cause of the access attempt type. In certain embodiments, the method 600 may include transmitting 604 the mapping to the remote unit.

In some embodiments, the mapping between the access attempt type and the first network configuration is based at least partly on a user equipment policy, and network policy, or a combination thereof. In certain embodiments, the first network configuration is configured to provide a higher priority service level than a second network configuration of the multiple network configurations. In various embodiments, the method 600 includes receiving a random access channel communication corresponding to the access attempt type using resources from the first network configuration. In some embodiments, the mapping between the access attempt type and the first network configuration is based at least partly on whether the access attempt type corresponds to transmitting control information, data, or a combination thereof.

In some embodiments, the method 600 may include granting access to a random-access channel based at least partly on the establishment cause. In certain embodiments, the method 600 may include granting a radio resource control connection based at least partly on the establishment cause. In various embodiments, the first network configuration may include a predetermined configuration of physical layer (L1) resources and Layer 2 (L2) resources. In some embodiments, the first network configuration includes a predetermined configuration of physical random-access channel resources. In certain embodiments, the predetermined configuration of the physical random-access channel resources includes a random-access channel preamble, a time resource, a frequency resource, or some combination thereof.

Figure 7:
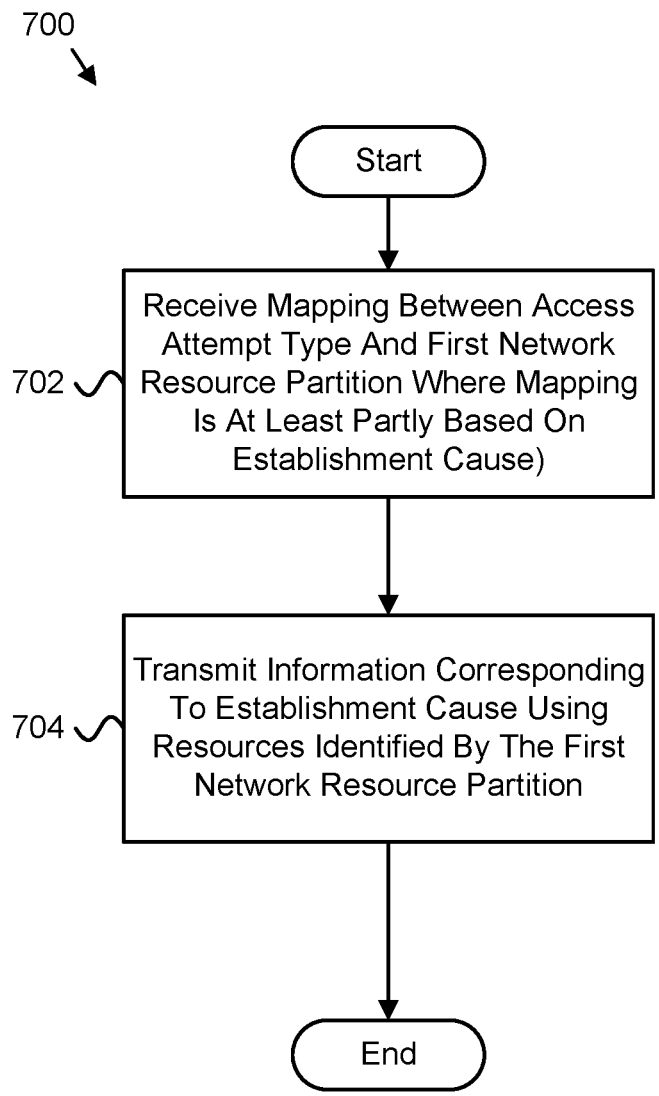
FIG. 7 is a schematic flow diagram illustrating one embodiment of a method for receiving a mapping between an access attempt type and a network configuration.

FIG. 7 is a schematic flow diagram illustrating one embodiment of a method for receiving a mapping between an access attempt type and a network configuration. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, an FPGA, or the like. In some embodiments, the method 700 may include receiving 702 a mapping between an access attempt type and a first network configuration of multiple network configurations. In various embodiments, the mapping is based at least partly on an establishment cause of the access attempt type. In certain embodiments, the method 700 may include transmitting 704 information corresponding to the establishment cause using resources identified by the first network configuration.

In some embodiments, the mapping between the access attempt type and the first network configuration is based at least partly on a user equipment policy, a network policy, or a combination thereof. For example, a particular user equipment type may prefer a certain network slice type. In certain embodiments, the first network configuration may be configured to provide a higher priority service level than a second network configuration of the multiple network configurations.

In some embodiments, the mapping is based on a high priority establishment cause, such as for example, Request for Recovery from Beam Failure, or a Handover and the first network configuration (e.g. resource partition) is based at least partly on a user equipment policy, a network policy, specification or a combination thereof. In certain embodiments, the first network configuration may be configured to provide a higher priority service level than a second network configuration partition of the multiple network configurations. The network configuration may include the physical layer and medium access layer parameters such as PRACH power ramping step size or RACH backoff time.

In some embodiments, the mapping is between about a higher priority establishment cause like Request for Recovery from Beam Failure, or a Handover and the first network configuration is based at least partly on a user equipment policy, a network policy, specification or a combination thereof. In certain embodiments, the first network configuration may be configured to provide a higher priority service level than a second network configuration of the multiple network configurations. The network configuration may include the physical layer and medium access layer parameters like PRACH power ramping step size or the RACH backoff time.

In various embodiments, the method 700 includes transmitting a random access channel communication corresponding to an access attempt type using resources from the first network configuration. In certain embodiments, the mapping between the access attempt type and the first network configuration is based at least partly on whether the access attempt type corresponds to transmitting control information, data or a combination thereof. In some embodiments, a random-access channel is established as a result of transmitting 704 the information.

In some embodiments, the method includes initiating establishment of a radio resource control connection based at least partly on the establishment cause. In various embodiments, the first network configuration includes a predetermined configuration of physical layer resources and Layer 2 resources. In certain embodiments, the first network configuration includes a predetermined configuration of random-access channel resources. In such embodiments, the predetermined configuration of physical random-access channel resources may include a physical random-access channel preamble, a time resource, a frequency resource, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining an access attempt type for a request from a remote unit to access a network device that supports a predetermined number of network slices;
   determining a radio resource control state for the remote unit;
   enhancing radio resource allocation by grouping the predetermined number of network slices into a smaller predetermined number of access attempt types based on inputs comprising the radio resource control state and a network slice type;
   mapping the access attempt type to a first network configuration of a predetermined number of network configurations that matches the predetermined number of access attempt types in response to determining that the remote unit is in a radio resource control connected state:
   mapping the access attempt type to a second network configuration of the predetermined number of network configurations in response to determining that the remote unit is in a radio resource control idle state; and
   transmitting the mapping to the remote unit.

2. The method of claim 1, wherein the mapping between the access attempt type and the first network configuration is based at least partly on a user equipment policy, a network policy, or a combination thereof.

3. The method of claim 1, wherein the first network configuration is configured to provide a higher priority service level than the second network configuration.

4. The method of claim 1, further comprising receiving a random access channel communication corresponding to the access attempt type using resources from the first network configuration.

5. The method of claim 4, further comprising granting access to a random access channel based at least partly on an establishment cause.

6. The method of claim 4, further comprising granting a radio resource control connection based at least partly on an establishment cause.

7. The method of claim 1, wherein the mapping between the access attempt type and the first network configuration is based at least partly on whether the access attempt type corresponds to transmitting control information, data, or a combination thereof.

8. The method of claim 1, wherein the first network configuration comprises a predetermined configuration of physical layer parameters and data link layer parameters.

9. The method of claim 1, wherein the first network configuration comprises a predetermined configuration of physical random access channel resources.

10. The method of claim 9, wherein the predetermined configuration of the physical random access channel resources comprises at least one of a physical random access channel, preamble, a time resource, a frequency resource, a transmit power, a power ramping step size, and a backoff timer value.

11. An apparatus comprising a processor that:
    determines an access attempt type for a request from a remote unit to access a network device that supports a predetermined number of network slices;
    determines a radio resource control state for the remote unit;
    enhances radio resource allocation by grouping the predetermined number of network slices into a smaller predetermined number of access attempt type based on inputs comprising the radio resource control state and a network slice type;
    determines a mapping between the access attempt type and a first network configuration of a predetermined number of network configurations that is less than the predetermined number of network slices in response to determining that the remote unit is in a radio resource control connected state;
    determines a mapping between the access attempt type and a second network configuration of the predetermined number of network configurations in response to determining that the remote unit is in a radio resource control idle state; and
    a transmitter that transmits the mapping to the remote unit.

12. A method comprising:
    entering a radio resource control state;
    receiving an enhanced radio resource allocation allocated by grouping a predetermined number of network slices into a smaller predetermined number of access attempt types based on inputs comprising the radio resource control state and a network slice type;
    receiving a mapping between an access attempt type and a first network configuration of a plurality of network configurations in response to the radio resource control state being a connected state based at least partly on a network slice type;
    receiving a mapping between the access attempt type and a second network configuration of the plurality of network configurations in response to the radio resource control state being an idle state, wherein the access attempt type is based at least partly on one or more inputs selected from a service type, and an access class; and
    transmitting information corresponding to the establishment cause using resources identified by the first network configuration.

13. The method of claim 12, wherein the mapping between the access attempt type and the first network configuration is based at least partly on a user equipment policy, a network policy, or a combination thereof.

14. The method of claim 12, wherein the first network configuration is configured to provide a higher priority service level than a second network configuration of the plurality of network configurations.

15. The method of claim 12, further comprising transmitting a random access channel communication corresponding to the access attempt type using resources from the first network configuration.

16. The method of claim 15, wherein a random access channel is established as a result of transmitting the information.

17. The method of claim 15, further comprising initiating establishment of a radio resource control connection based at least partly on an establishment cause.

18. The method of claim 12, wherein the mapping between the access attempt type and the first network configuration is based at least partly on whether the access attempt type corresponds to transmitting information selected from control information, data, or a combination thereof.

19. The method of claim 12, wherein the first network configuration comprises a predetermined configuration of physical layer parameters and data link layer parameters.

20. The method of claim 12, wherein the first network configuration comprises a predetermined configuration of physical random access channel resources.

21. The method of claim 20, wherein the predetermined configuration of the physical random access channel resources comprises at least one of a physical random access channel preamble, a time resource, a frequency resource, a transmit power, a power ramping step size, and a backoff timer value.

22. An apparatus comprising:
- a receiver that enters a radio resource control state, wherein the receiver receives an enhanced radio resource allocation allocated by grouping a predetermined number of network slices into a smaller predetermined number of access attempt types based on inputs comprising the radio resource control state and a network slice type, wherein the receiver further receives a mapping between an access attempt type and a first network configuration of a plurality of network configurations in response to the radio resource control state being a connected state, and
- wherein the mapping is based on a network slice type and up to four more inputs selected from a service type, an access class,
- whether a requested access is for transmitting control information or data, and
- an establishment cause of the access attempt type; and
- a transmitter that transmits information corresponding to the access attempt type using resources identified by the first network configuration.

\* \* \* \* \*